(12) United States Patent
Gregory et al.

(10) Patent No.: US 6,970,535 B2
(45) Date of Patent: Nov. 29, 2005

(54) WIRELESS MESSAGING SYSTEM TO MULTIPLE RECIPIENTS

(75) Inventors: Keith Edward Gregory, Acton, MA (US); Yola Kateline Jean-George, Roxbury, MA (US); William Harry Kirtley, Arlington, MA (US); David A. Page, Manchester, MA (US); Howard Geza Page, Burlingame, CA (US); Adrien Paul Raphael Schmidt, Paris (FR); Gregory Charles Warden, Belmont, MA (US)

(73) Assignee: Envoy WorldWide, Inc., Bedford, MA (US)

( * ) Notice: Subject to any disclaimer, the term of this patent is extended or adjusted under 35 U.S.C. 154(b) by 0 days.

(21) Appl. No.: 10/132,605

(22) Filed: Apr. 25, 2002

(65) Prior Publication Data

US 2002/0168965 A1    Nov. 14, 2002

Related U.S. Application Data

(60) Provisional application No. 60/287,094, filed on Apr. 25, 2001.

(51) Int. Cl.[7] .............................................. H04M 1/64
(52) U.S. Cl. ..................... 379/88.13; 379/67.1; 379/70; 379/88.04; 379/88.07; 379/88.11; 379/88.12; 379/88.16; 379/88.17; 379/88.18; 379/88.22; 379/88.25
(58) Field of Search ....................... 379/67.1, 70, 88.04, 379/88.07, 88.11, 88.12, 88.13, 88.16, 88.17, 379/88.18, 88.22, 88.25

(56) References Cited

U.S. PATENT DOCUMENTS

| | | | |
|---|---|---|---|
| 5,179,660 A | 1/1993 | Devany et al. ............. 395/200 |
| 5,287,498 A | 2/1994 | Perelman et al. ........... 395/600 |
| 5,673,256 A | 9/1997 | Maine | |
| 5,706,334 A | 1/1998 | Balk et al. | |
| 5,740,231 A | 4/1998 | Cohn et al. .................... 379/89 |
| 5,742,905 A * | 4/1998 | Pepe et al. .................... 455/461 |
| 5,758,088 A | 5/1998 | Bezaire et al. ......... 395/200.62 |
| 5,794,039 A | 8/1998 | Guck .......................... 395/683 |
| 5,796,394 A | 8/1998 | Wicks et al. | |
| 5,818,447 A | 10/1998 | Wolf et al. | |
| 5,838,252 A | 11/1998 | Kikinis .................. 340/825.44 |
| 5,841,966 A | 11/1998 | Irribarren ............... 395/200.36 |
| 5,850,594 A | 12/1998 | Cannon et al. | |

(Continued)

FOREIGN PATENT DOCUMENTS

WO    US98/12531    6/1998

(Continued)

OTHER PUBLICATIONS

U.S. Appl. No. 09/496,170, Delaney et al.

(Continued)

*Primary Examiner*—Allan Hoosain
(74) *Attorney, Agent, or Firm*—Miele Law Group; Anthony L. Miele

(57) ABSTRACT

A two way wireless hand held PDA device that allows remote mobile creation of messages and sending of those messages to recipients via different delivery modes. The recipients can be formed into groups by different criteria, the messages can be created or imported and edited from the remote device, and the messages can be delivered via more than one mode. Status of messages sent and in process is maintained as is account information related to the message and the user. Also messages can be formatted, and can be conditionally sent and receivers can perform automatic actions when specific messages are received. (And actions can be carried out in remote systems based on the responses to messages sent).

1 Claim, 4 Drawing Sheets

U.S. PATENT DOCUMENTS

| | | | | |
|---|---|---|---|---|
| 5,870,454 | A | 2/1999 | Dahlén | |
| 5,872,926 | A * | 2/1999 | Levac et al. | 395/200.36 |
| 5,875,436 | A | 2/1999 | Kikinis | |
| 5,892,909 | A | 4/1999 | Grasso et al. | |
| 5,903,830 | A | 5/1999 | Joao et al. | |
| 5,905,777 | A | 5/1999 | Foladare et al. | |
| 5,928,325 | A * | 7/1999 | Shaughnessy et al. | 709/206 |
| 5,940,475 | A | 8/1999 | Hansen | |
| 5,940,478 | A | 8/1999 | Vaudreuil et al. | |
| 5,956,681 | A | 9/1999 | Yamakita | |
| 5,960,406 | A | 9/1999 | Rasansky et al. | |
| 5,964,833 | A | 10/1999 | Kikinis | |
| 5,966,663 | A | 10/1999 | Gleason | |
| 5,978,837 | A | 11/1999 | Foladare et al. | |
| 6,014,427 | A * | 1/2000 | Hanson et al. | 379/67.1 |
| 6,014,429 | A * | 1/2000 | LaPorta | 379/88.15 |
| 6,021,433 | A | 2/2000 | Payne et al. | |
| 6,034,970 | A | 3/2000 | Levac et al. | |
| 6,072,862 | A | 6/2000 | Srinivasan | 379/100.08 |
| 6,292,473 | B1 * | 9/2001 | Duske, Jr. et al. | 370/316 |
| 6,363,414 | B1 | 3/2002 | Nicholls et al. | 709/206 |
| 6,363,415 | B1 | 3/2002 | Finney et al. | 709/206 |
| 6,438,584 | B1 | 8/2002 | Powers | 709/206 |
| 6,442,250 | B1 | 8/2002 | Troen-Krasnow et al. | 379/93.15 |
| 6,442,592 | B1 | 8/2002 | Alumbaugh et al. | 709/206 |
| 6,477,150 | B1 * | 11/2002 | Maggenti et al. | 370/312 |
| 6,498,835 | B1 | 12/2002 | Skladman et al. | 379/88.12 |
| 6,597,688 | B2 | 7/2003 | Narasimhan et al. | 370/353 |
| H2079 | H | 9/2003 | Menon et al. | 370/329 |
| 6,630,883 | B1 | 10/2003 | Amin et al. | 340/7.29 |
| 6,631,258 | B1 | 10/2003 | Chow et al. | 455/417 |
| 6,647,257 | B2 | 11/2003 | Owensby | 455/414.1 |
| 2001/0005859 | A1 | 6/2001 | Okuyama et al. | 709/245 |
| 2001/0016868 | A1 | 8/2001 | Nakamura et al. | 709/202 |
| 2002/0065889 | A1 | 5/2002 | Macor | 709/206 |
| 2002/0065890 | A1 | 5/2002 | Barron | 709/206 |
| 2002/0069116 | A1 | 6/2002 | Ohashi et al. | 705/26 |
| 2002/0077130 | A1 | 6/2002 | Owensby | 455/466 |
| 2002/0102993 | A1 | 8/2002 | Hendrey et al. | 455/456 |
| 2002/0156896 | A1 | 10/2002 | Lin et al. | 709/227 |
| 2002/0160794 | A1 | 10/2002 | Tisserand et al. | 455/466 |
| 2002/0161841 | A1 | 10/2002 | Kinnunen | 709/206 |
| 2002/0165923 | A1 | 11/2002 | Prince | 709/206 |
| 2002/0177456 | A1 | 11/2002 | Kimoto et al. | 455/466 |
| 2003/0088434 | A1 | 5/2003 | Blechman | 705/1 |
| 2003/0088465 | A1 | 5/2003 | Monteverde | 705/14 |
| 2003/0110225 | A1 | 6/2003 | Billadeau | 709/206 |
| 2003/0126216 | A1 | 7/2003 | Avila et al. | 709/206 |
| 2003/0154257 | A1 | 8/2003 | Hantsch et al. | 709/207 |
| 2003/0161448 | A1 | 8/2003 | Parolkar et al. | 379/88.17 |
| 2003/0163536 | A1 | 8/2003 | Pettine, Jr. | 709/206 |
| 2003/0177277 | A1 | 9/2003 | Dascalu | 709/313 |
| 2003/0195937 | A1 | 10/2003 | Kircher, Jr. et al. | 709/207 |
| 2003/0204556 | A1 | 10/2003 | Bernard | 709/200 |
| 2003/0208363 | A1 | 11/2003 | Thurnher | 705/1 |
| 2003/0208545 | A1 | 11/2003 | Eaton et al. | 709/206 |

FOREIGN PATENT DOCUMENTS

| | | |
|---|---|---|
| WO | WO 00/48351 | 8/2000 |
| WO | WO 01/67284 | 9/2001 |
| WO | WO 01/69385 | 9/2001 |
| WO | WO 02/37393 | 5/2002 |
| WO | WO 02/087095 | 10/2002 |
| WO | WO 03/021796 | 3/2003 |

OTHER PUBLICATIONS

U.S. Appl. No. 60/246,140, Castanho et al.

Newman, Mark, et al. A Look at Power Consumption and Performance on the 3 Com Palm Pilot, UC Berkeley, CS252, Spring 1998.

Brunson, Gordon R., et al. Unified Messaging—A Value-Creating Engine for Next-Generation Network Services, Bell Labs Technical Journal, Apr.-Jun. 1999, 71-87, USA.

* cited by examiner

WIRELESS MESSAGING SYSTEM TO MULTIPLE RECIPIENTS

CROSS-REFERENCE TO RELATED APPLICATION

The present application claims the benefit of U.S. Provisional Patent Application Ser. No. 60/287,094, which was filed on Apr. 25, 2001, by common inventors and with a common title, and which is hereby incorporated herein by reference.

The present application is also related to U.S. Ser. No. 09/496,170, filed on Feb. 1, 2000 and entitled Multi-Mode Message Routing and Management, and which application is hereby incorporated herein by reference.

BACKGROUND OF THE INVENTION

1. Field of the Invention

The present invention relates to wireless communications to programmable multiple receivers, and more particularly to a wireless user sending messages to multiple recipients.

2. Background Information

Thanks to improvements in technology and widespread consumer interest, once-exotic forms of communication have become commonplace, and today the average consumer has access to a broad array of communications services. The Internet and wireless telephony, once the preserve of an elite few, now routinely supplement traditional telephone services and are frequently supplied by the same carriers. Even inexpensive home computers now include facsimile capability. Businesses employing mobile employees can furnish them with economical pagers that incorporate advanced features, such as text transmission and Internet access.

The sheer proliferation of communication options, while greatly improving access and convenience, has engendered problems as well. The existence of a communication channel does not ensure that the recipient of a message will be "listening" to that particular channel at a given time, yet the sender of a message has no way to know this. Indeed, more channels of communication traffic mean more demands on the attentions of potential recipients, who, feeling besieged by the assault of e-mail, voice mail, pages, etc., may simply inactivate some communication devices at different times. Message senders, therefore, are faced with the choice of risking non-delivery of their messages, or painstakingly re-transmitting a message on every possible mode of communication modality.

It may also be difficult to transmit the same message to multiple recipients. While a single e-mail message, sent once, can reach an unlimited number of destinations, phone messages must be repeated for each call. Moreover, different recipients may have access to different types of communication channels; perhaps some recipients can be reached efficiently only by e-mail, others by fax, and still others by page.

The integration of communication input devices also raises the prospect of messages having multiple forms of content. Today, a single message may include input from a variety of sources (e.g., voice and text); transmitting such a message by traditional means may be quite cumbersome, involving multiple separate transmissions that must be coordinated and packaged for the receiver to present a coherent message.

U.S. Ser. No. 09/496,170, filed on Feb. 1, 2000 and entitled Multi-Mode Message Routing and Management discloses, inter alia, a facility for transmission of messages composed on one or more input devices to a single or multiple recipients by means of one or plural communication modalities. Such communication modalities may include, for example, conventional or wireless telephone, facsimile transmission, pager, e-mail, postal mail or courier. Thus, a message may be directed to a single recipient via multiple modalities, such as e-mail and fax, in order to ensure the earliest possible receipt of the message; or it may be directed to multiple recipients by a single modality or by different modalities (e.g., some recipients receive the message by e-mail, others by fax, others by phone). Another application program interface was designed to work with the '170 application, and a provisional patent application entitled Application Program Interface for Multi-Mode Message Handling, Ser. No. 60/621,188, was filed on Jul. 21, 2000. This provisional application is hereby incorporated by reference herein.

The invention disclosed in the '170 application may include functionality for determining whether a message has been received (e.g., telephone and e-mail polling), as well as automatic sender notification upon confirmation of receipt. Moreover, in addition to monitoring messages in order to confirm their receipt, the invention may facilitate recipients' responses. In this way, the invention can orchestrate multi-question surveys utilizing multiple communication modes; for example, individuals contacted directly can respond immediately, while others can respond later in accordance with instructions delivered to them—e.g., via a web site or by calling a toll-free number. Additionally, the responses to these questions can in turn be automatically delivered to a human or remote system to initiate further actions or system behaviors, thus completing a step in a workflow.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

SUMMARY OF THE INVENTION

The above limitations and other advantages are provided by a messaging system with an interface for entering and displaying information for a user. One or more recipients are selected from a table and one or mores messages are selected and/or composed for distributing to the recipients. The messages are tracked and are associated or linked to an account for, in a preferred embodiment, proper billing and/or other specific information or instructions related to the account.

The tracking, in a preferred embodiment, will accumulate and retain for later use information with respect to unsuccessful attempts and successful deliveries, the modality of messages sent, recipients, detailed information, e.g. time of day, number of attempts, and the like.

In practice the messages may be sent via one of many modalities, e.g. in a preferred embodiment including regular mail, fax, messenger, e-mail, voice mail, file transfer, etc. In specific instances there may be one or more messages sent to one of more recipients via several of the modalities.

The present invention provides means for prioritizing the modality and the devices used for sending prioritized messages to prioritized recipients.

Means are included, in a preferred embodiment, for editing, deleting, adding, importing, combining and creating both lists of recipients and messages. For ease of use, labels may be assigned and associated with recipient or lists thereof. Also, titles, keywords, or the subject of the messages may be created and used for reference, informational and retrieval purposes.

Messages may be sent with added information and material, e.g. branding, headers, questions, formatting, and boilerplate text (disclaimers, warnings, and the like). And, questions and associated answers and comments with recipient details can be accumulated for later review and analysis.

Triggering conditions may also be established wherein a remote device automatically causes one or more messages to be sent to one or more recipients or groups of recipients via one or more of the associated receiving devices. Moreover, the conditions, like time of day, time zone, area code, status and special information may condition the triggering and the associated response of the present invention.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

In some embodiments, the present invention provides a coordinated application working with the '170 invention delivery engine that will allow users to compose and send messages to multiple receivers from a wireless personal digital assistant (PDA). The present invention is constructed and arranged to operate with operating systems available for such PDA's, for example the Palm, Handspring Visor, Pocket PC, or virtually any operating system (OS) available. In some preferred embodiments the PDA may be part of a cell phone or lap top computer or similar electronic device.

Figure 1:
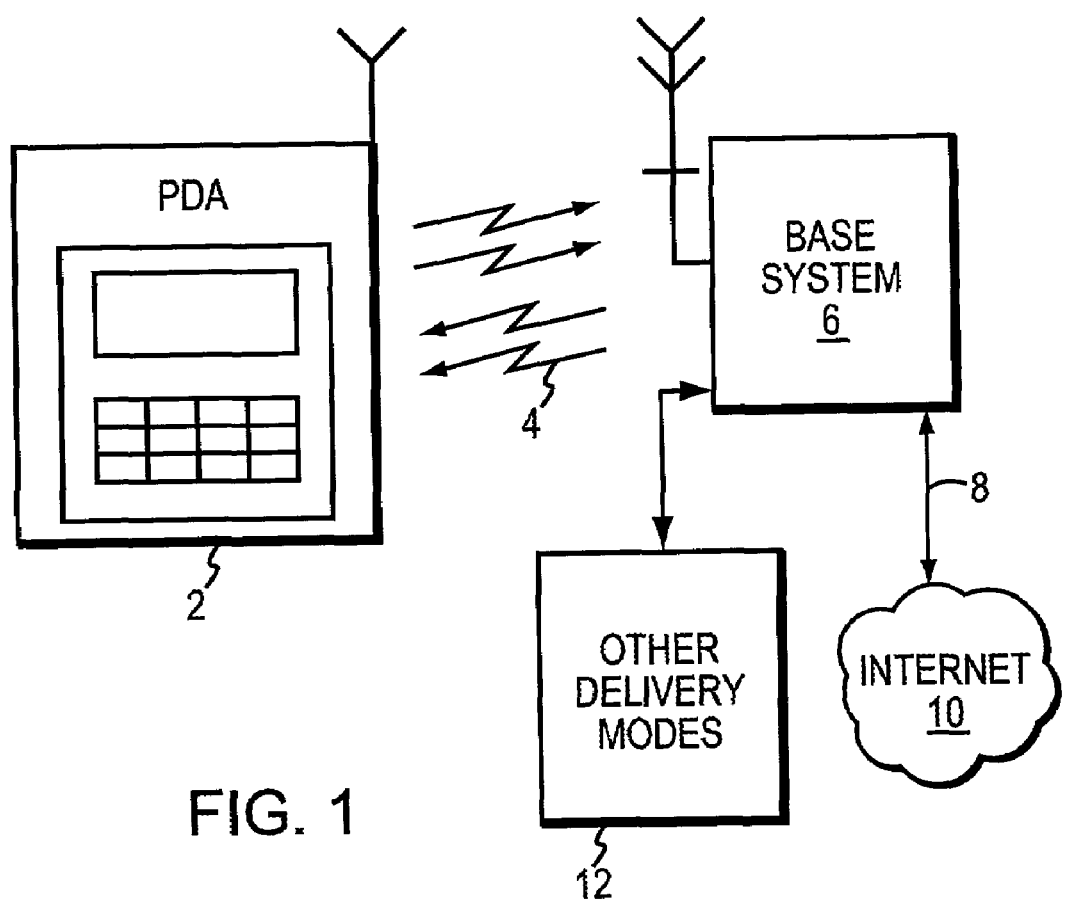
FIG. 1 is a block diagram/schematic of a preferred embodiment of the inventive system.

FIG. 1 is a basic system where a PDA 2 communicates bilaterally (sends and receives) 4 via radio, light, sound or infrared or other such waves to a base system 6. The base system comprises the inventive system as described and discussed in the '170 application, with the added capability of communicating with the PDA by means of the PDA's wireless capabilities and the API described in '188. In this case the base system includes means for communicating 8 via the Internet 10 and other delivery means 12. The other delivery means includes the modalities of facsimile, telephone, pager, short message service [SMS], wireless application protocol [WAP] alerts and postal mail.

The '170 is well discussed in the above incorporated by reference patent application and will be discussed briefly herein for clarity. The information communicated from the PDA to the base system is well discussed in '188.

Figure 2:
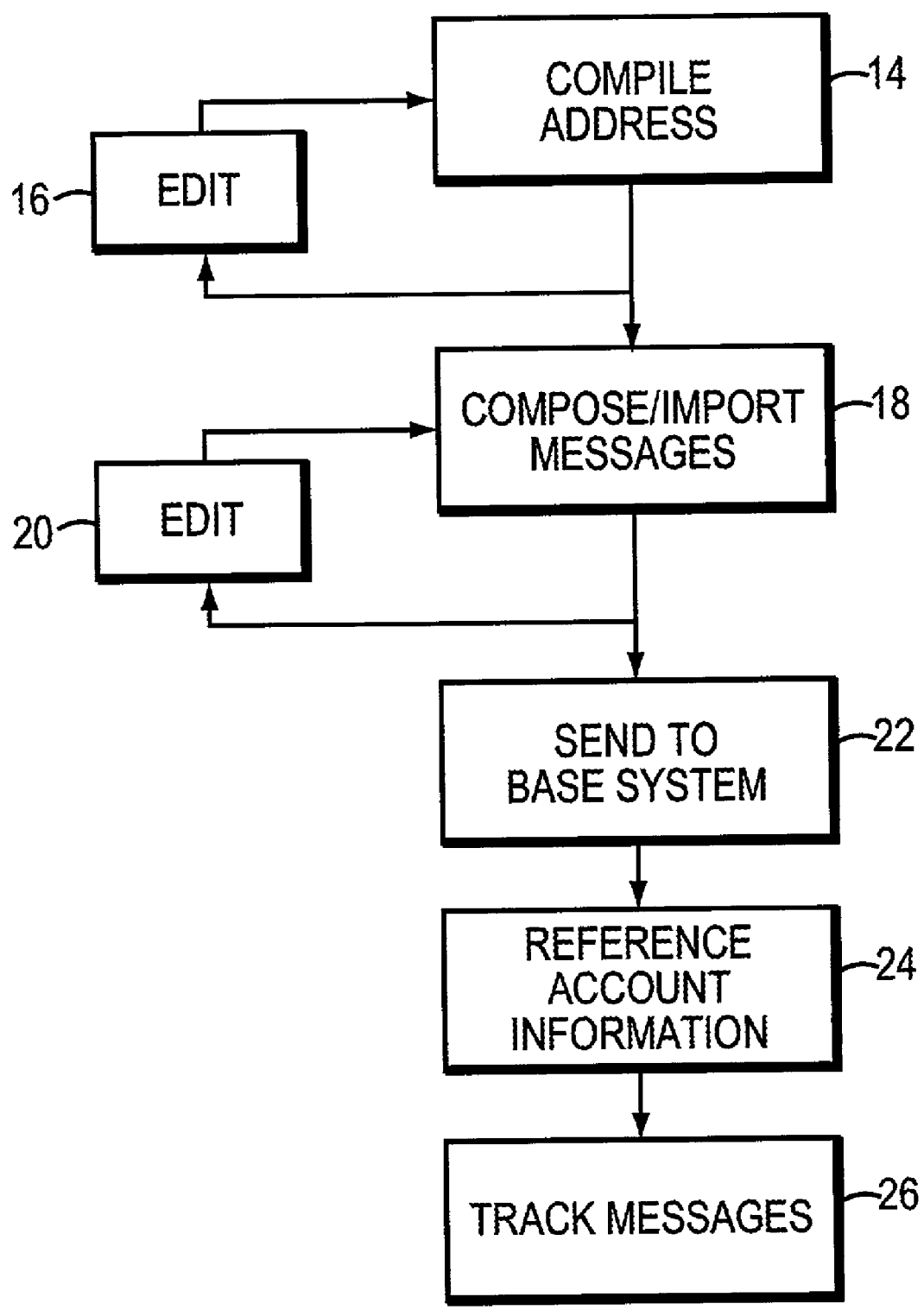
FIG. 2 is a block diagram flow chart.

FIG. 2 shows the basic functions employed by a preferred embodiment of the present invention (principally a coordinated application running on a PDA). A first step is to compile a table 14 of addresses of message recipients. Included are names of people and specific delivery types (John's home phone, for example). The table may be contained in a memory associated with the PDA, but may also be remote from, but accessible to, the PDA. The addressee list may be edited 16. Next a message is composed or imported 18 and it may be edited 20. The addressees and the message or messages are sent to the base system 22 according to protocols specified in '188. Relevant account file information is referenced for bookkeeping purposes. Included as part of the coordinated application is a means to create and verify new accounts. Once transferred to the base system, the message(s) are sent via the delivery mode or modes designated. Prior sent messages are tracked and stored 26 for status purposes.

Figure 3:
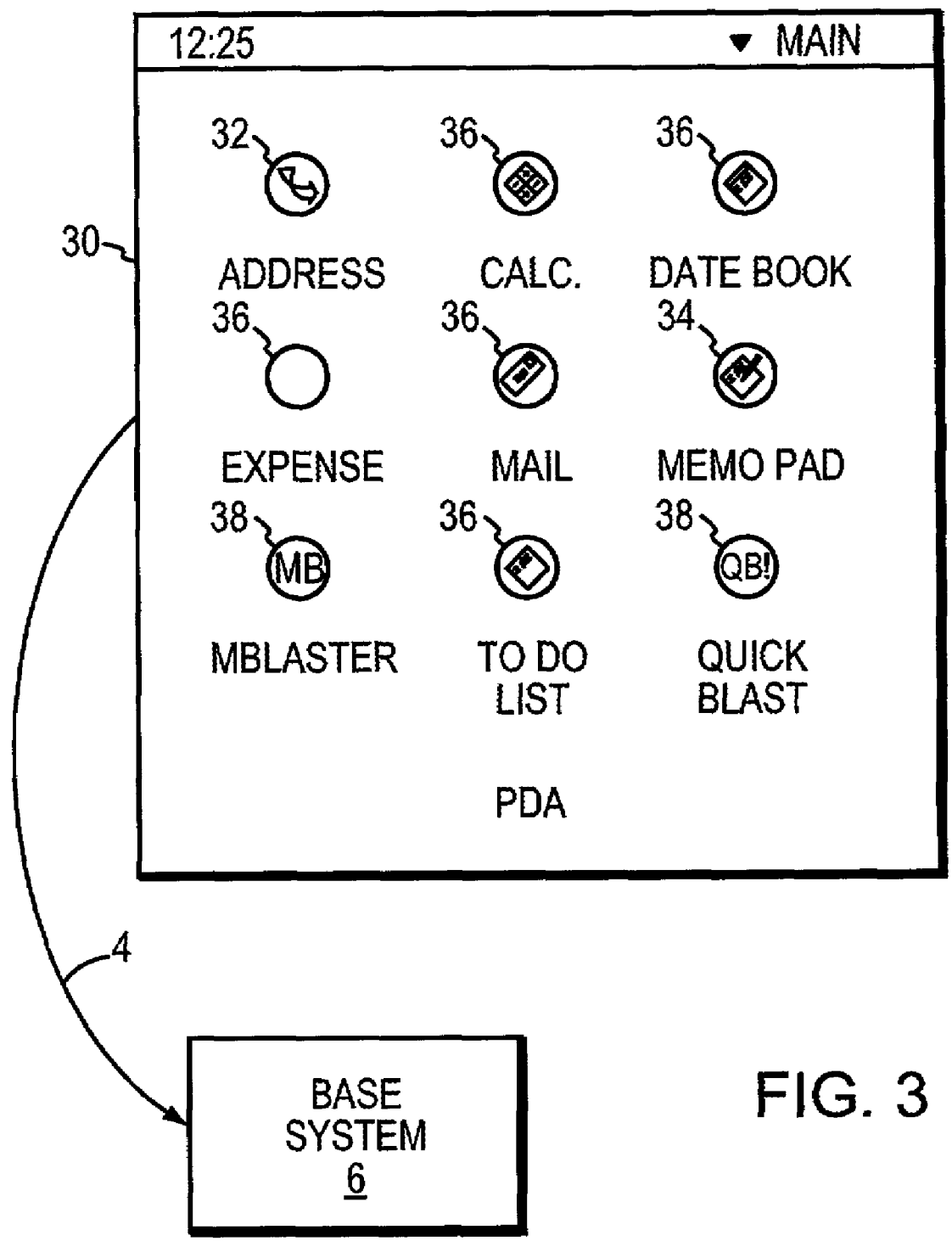
FIG. 3 is a block diagram of a preferred user interface.

FIG. 3 shows a preferred display panel 30 associated with a preferred wireless PDA showing the communication path 4 to the inventive system base system 6 as described preferably in the '170 application.

The touch panel control buttons on the PDA display 30 include buttons to access the addressee table 32, a memo pad 34, and commonly found functions 36 on PDA's including a "to do" list a "date book," a calculator, expense list, a mail list, and means for starting the coordinated application which orchestrates the communicating with the base system 38. Of course other types of data selection and entry, as is known in the art, can be used rather than hardware or software buttons.

One preferred embodiment of the present invention enables users to compose and send messages to multiple recipients on multiple devices from a wireless PDA or device. The embodiment combines some native functions on the PDA with a custom coordinated messaging application. It is understood that terms used below, such as "Address Book," "Memo Pad," and the like are those used in the Palm OS, but are meant herein generically, and those skilled in the art will understand the functions described apply to other PDA OS's. The term "messaging application" refers to the non-native functions to the PDA which complete the functionality of the preferred embodiment.

The following steps and functions outline a preferred embodiment of creating and sending messages.

A. Creating and Sending a Message
1. Compose a message using the text entry capabilities of the PDA (The Memo Pad). Save the message in the PDA's memo storage area.
2. Run the messaging application from the PDA's Main Menu. Select Send Message from the main menu.
3. From within the messaging application, select a distribution list to send to. This distribution list contains a list of recipients and the preferred communications channels for each recipient (See the following section B for a description of a preferred embodiment of creating a distribution list).
4. Again from within the application, select the memo created in Step 1 from the list of memos in the PDA's memo storage area.
5. Set additional message options, including sender account information (login and password for the base messaging system), survey questions, message urgency, callback numbers, escalation rules, etc.
6. Review options and confirm interest in sending the message.

7. Instruct the messaging application to transmit the recipient and message information to the base system, which in turn automatically delivers the message to the recipients on their preferred delivery devices.
8. Receive information back from base system regarding message delivery status.

The following section describes a preferred embodiment for creating distribution lists.

B. Creating Distribution Lists
1. Enter the recipients and corresponding contact information (phone numbers, e-mail addresses, etc) into the PDA's native address book by any number of means native to the PDA.
2. Run the messaging application from the PDA's main menu. Select Manage Distribution Lists from the main menu.
3. Select create new distribution list. Enter a name for the list.
4. From a list of recipients in the PDA's native address book, select each recipients to be included in the list.
5. For each recipient select the devices (contact information) belonging to that person that should be used when this distribution list is selected in the message sending process (you might want to have an e-mail list, and a separate phone list, for example).
   Enter a long description of the distribution list.
6. Save the list. It is now available for use in the message sending process.

Tracking of sent messages insures the sender that the messages were sent properly. Below is a description of the steps for tracking messages in the preferred embodiment:

C. Tracking Messages
1. Select the messaging application from the PDA's main menu. Select Track Messages from the main menu.
2. A Track Message page displays a list of the 10 last messages sent with a high level summary for these messages. In the preferred embodiment, this summary information is stored locally on the PDA. Included for each message sent:
   Subject
   Recipient distribution list name
   Number of recipients (not devices)
   A Job ID which is a unique reference to an ID stored on the message delivery base system, by which more detailed information can be queried.
   Selecting a message from the list requests that more detailed information about the message be gathered from the message delivery base system.
3. The more detailed information gathered from the base system includes:
   Date, subject, recipients, message body
   Total number of recipients
   Total number of contact methods
   Total number delivered
   Total number of deliveries in progress
   Total number of undeliverable delivery requests
   Detailed data about each recipient, delivery attempt, and survey responses.

Figure 4:
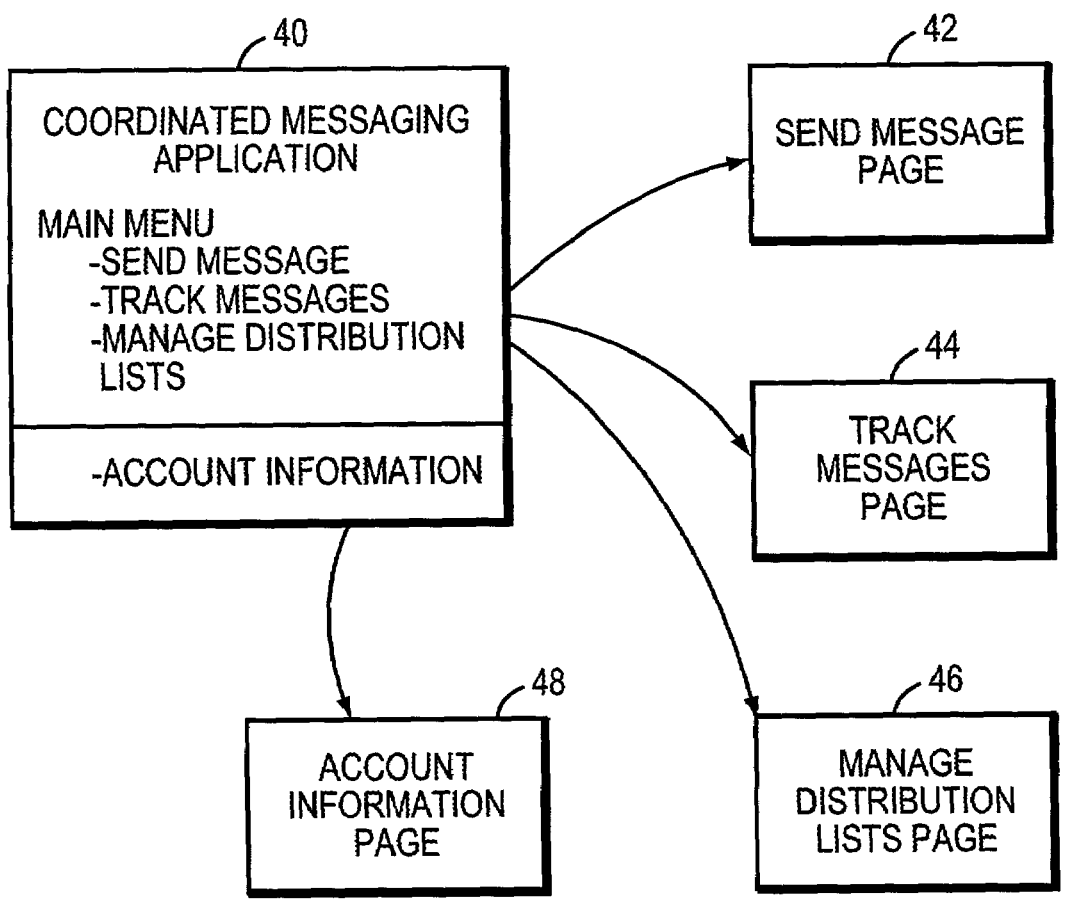
FIG. 4 is a block diagram of the base system functions.

FIG. 4 shows a preferred embodiment of the main interactive user page 40 for the coordinated messaging application 2. These functions include an interactive page 42 regarding the sending of the message, tracking the messages 44, managing the distribution recipient lists 46, and editing the account information 48.

It should be understood that above-described embodiments are being presented herein as examples and that many variations and alternatives thereof are possible. Accordingly, the present invention should be viewed broadly as being defined only as set forth in the hereinafter appended claims.

What is claimed is:
1. A portable two way wireless device comprising:
   a portable housing;
   two way wireless communication circuitry;
   an interface to enter and display information;
   a sender-side message compose mechanism to compose at the interface a given message;
   a sender-side designation mechanism to designate at the interface a list corresponding to the given message, the list comprising (i) a set of multiple human recipients and (ii) different delivery modes and preferred contact addresses for transmitting the message to respective ones of the multiple human recipients; and
   a base system transfer mechanism to transfer the given message and the list to a base system for sending by the base system of the given message via the different delivery modes to the respective ones of the multiple human recipients at the preferred contact addresses.

* * * * *